Dec. 4, 1928.　　　　　　　　　　　　　　　　1,693,851
H. MASON
ELEVATOR SYSTEM
Filed Aug. 24, 1926　　　3 Sheets-Sheet 1
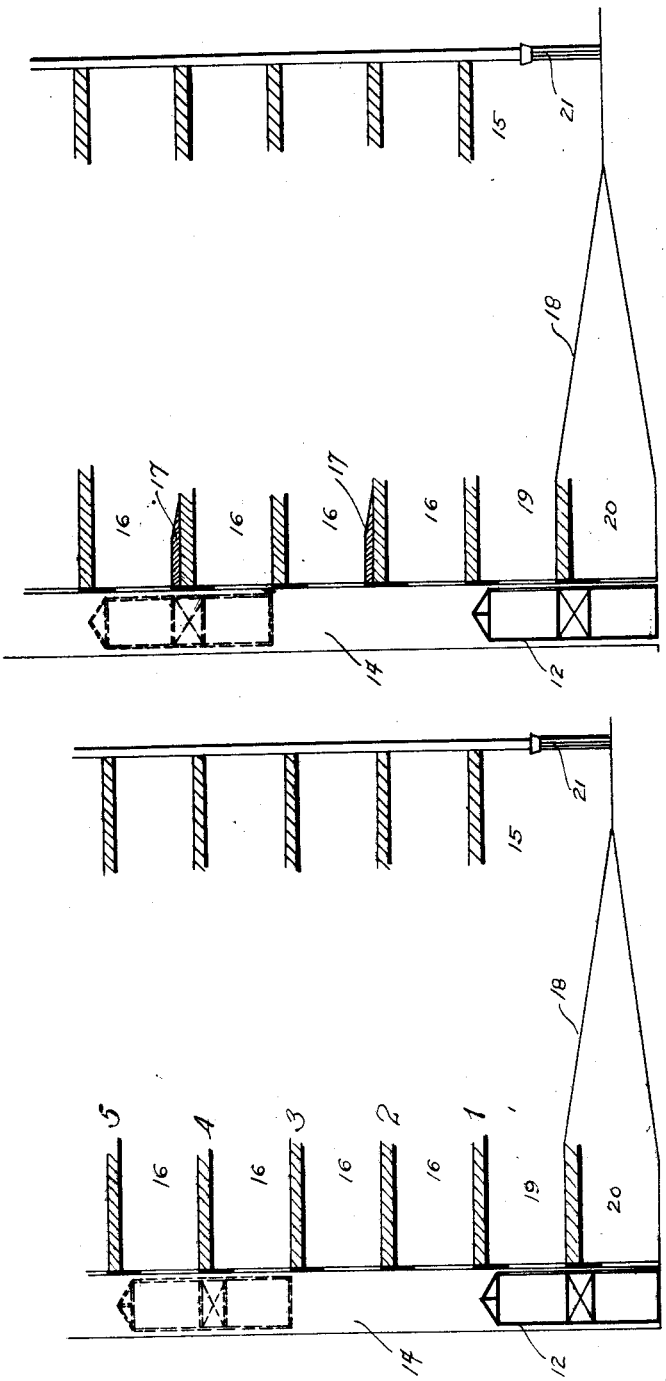
INVENTOR:
Hobart Mason,
BY
Augustus M. Henry
ATTORNEY Dec. 4, 1928.
H. MASON
1,693,851
ELEVATOR SYSTEM
Filed Aug. 24, 1926    3 Sheets-Sheet 2
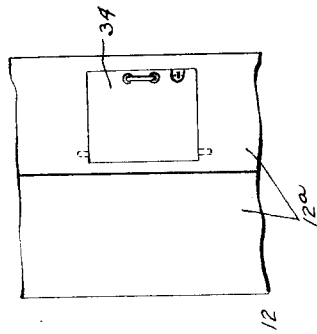
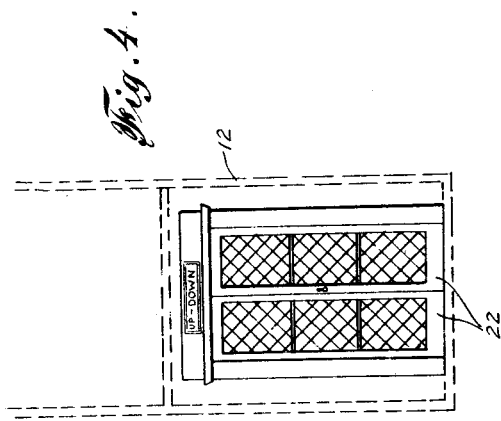
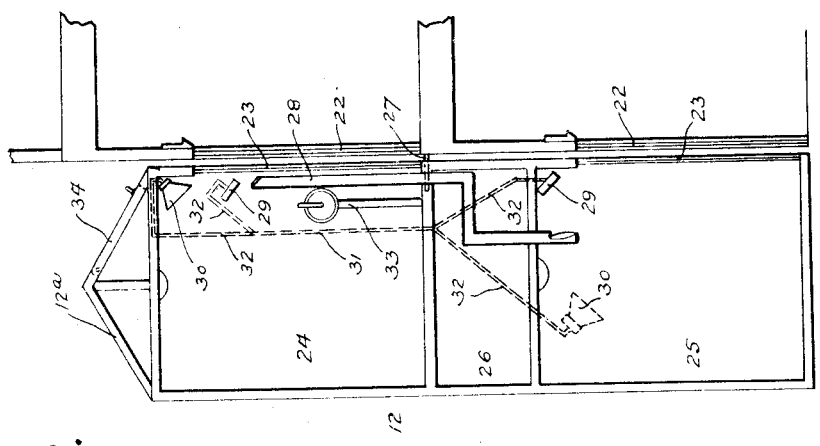
INVENTOR:
Hobart Mason,
BY
Augustus M. Henry
ATTORNEY Dec. 4, 1928.
H. MASON
1,693,851
ELEVATOR SYSTEM
Filed Aug. 24, 1926  3 Sheets-Sheet 3
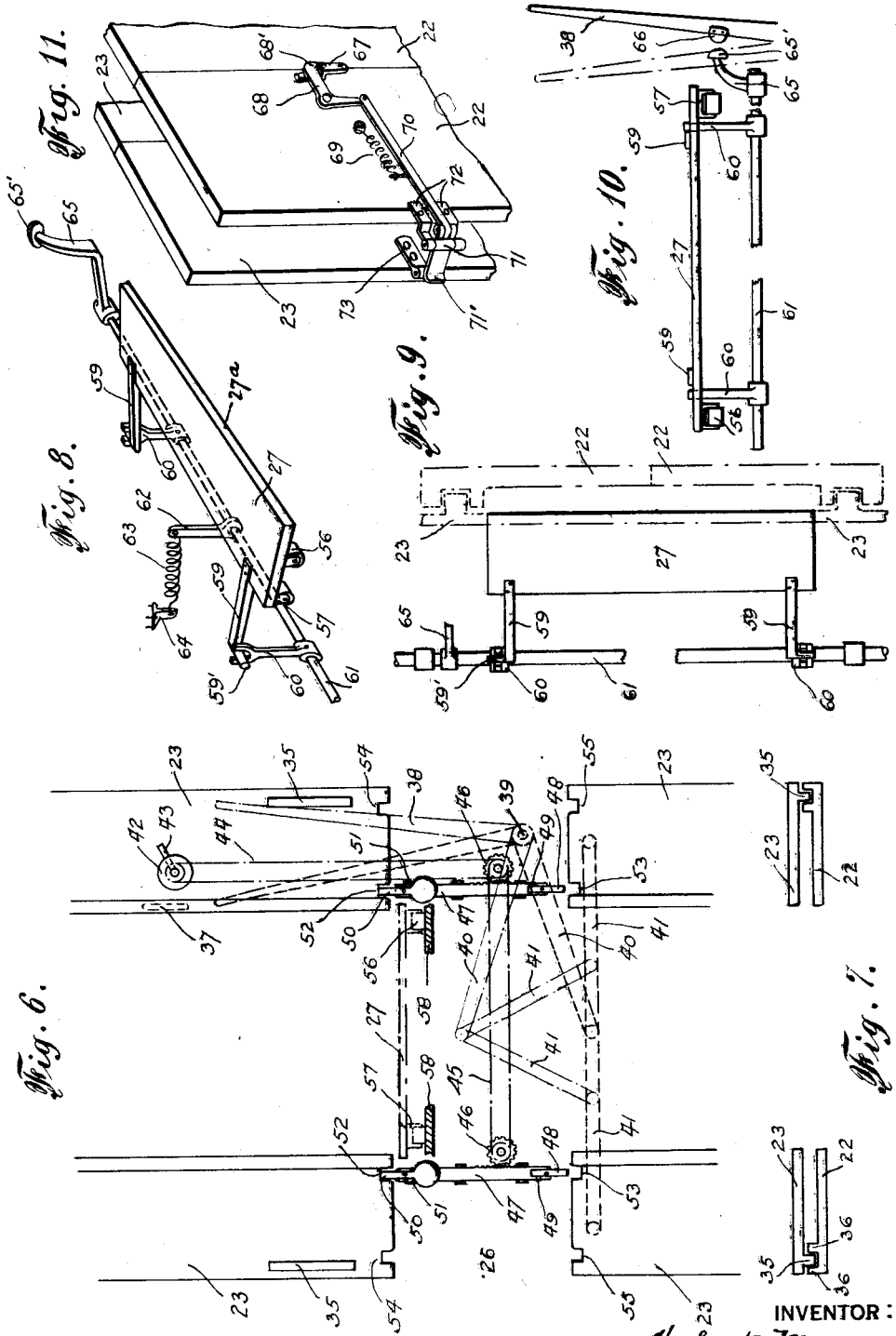
INVENTOR:
Hobart Mason
BY
Augustus M. Henry
ATTORNEY Patented Dec. 4, 1928.

1,693,851

UNITED STATES PATENT OFFICE.

HOBART MASON, OF WESTFIELD, NEW JERSEY.

ELEVATOR SYSTEM.

Application filed August 24, 1926. Serial No. 131,151.

This invention relates to the art of controlling passenger traffic from higher to lower floors and vice versa, especially in multi-storied buildings of the so-called sky-scraper type.

The invention particularly seeks to provide a method and apparatus whereby a previous limitation on the height of buildings of this type, and consequently on the income producing capacity of the underlying land, may be overcome. This limitation, where the land is in the business district of a large city, as is most common in buildings of the sky-scraper type, fixed a maximum combined investment in land and building which, economically, cannot be exceeded; with the inevitable result, as is well known, that the land itself is soared to excessive costs. This limitation has followed from the fact that the higher the building, the greater the need for more elevators, and for elevator shafts of larger cross-section. Also, the larger the elevator floor area and the greater the number of correspondingly dimensioned shafts, the greater floor space is required to be taken from each floor served by any shaft. In other words, the present method of floor to floor passenger transport in tall buildings imposes a positive check on the number of floors that can economically be provided; so that a point is reached where an additional floor will have to be so much reduced in habitable area that rent income therefrom will not meet the cost of repairs, service, and interest on the investment involved.

One of the objects of the present invention is to provide a passenger transporting system, whereby a greater number of passengers may be handled per shaft and elevator or cage, over a given period, than heretofore.

Another object is to provide a passenger transporting system whereby a less number of stops than heretofore may be made by a cage in a shaft, for the receiving and discharging of passengers at all the floors served by that shaft.

Another object is to provide a passenger transporting system, whereby a less number of cage attendants than heretofore is required, for the transporting of a given number of passengers per hour, regardless of their floor destinations.

Another object is to provide a passenger transporting system, whereby the above advantages and others may be obtained in the routing and handling of inter-floor passenger traffic, especially in a building constructed, as is often the case, with the street level or main floor of considerably greater ceiling height than the floors thereabove.

Another object is to provide a system of the kind hereinabove indicated, wherein various means, mechanisms and appliances form part of the apparatus combinations to insure safety yet ease of door operation and closure, as well of the doors or gates of the cage as of the doors or gates of the shaft; to insure safety of passengers passing said gates or doors when opened; to give a single operator practicable control of all said gates or doors; and to insure that such control may be exercised by the aid of messages or signals, or of inspections of passengers separated from said operator by a partition in the cage, or of both.

In the accompanying drawings is shown, as an example of one type of apparatus which facilitates the carrying out of the invention, a form of apparatus now preferred, although of course merely illustrative and not to be taken as definitive of or limiting in any way the invention itself.

In said drawings,

Fig. 1 is a schematic vertical section, taken through the lower part of a building of the sky-scraper type;

Fig. 2 is a similar view, showing a slight but desirable ramp-modification at certain of the upper floors where such floors are of different ceiling heights;

Fig. 3 is a schematic side elevation showing one of the cages of Figs. 1 and 2 on an enlarged scale, and also showing certain auxiliaries in aid of safe and speedy operation;

Fig. 4 is a front elevation, showing, on a slightly smaller scale than that of Fig. 3, a pair of shaft or well-closing gates at one of the floors;

Fig. 5 is a fragmentary view, showing a part of the cage of Fig. 3 in top plan;

Fig. 6 shows in detail and in front elevation, various elements of the operating equipment of a cage such as that shown in Fig. 3;

Fig. 7 is a top plan view, showing say the lower set of cage-doors or gates of Fig. 6, temporarily locked to a pair of well-closing gates at the floor opposite to which the lower compartment of the two-compartment cage illustrated, has stopped, and showing both pairs of gates in open condition;

Fig. 8 is a perspective view, showing further details of structure of certain of the elements of Fig. 6, on a somewhat enlarged scale;

Fig. 9 is a top plan view of the parts shown in Fig. 8, and also showing, in broken lines, the gates of Fig. 7 in closed condition;

Fig. 10 is a front elevation of the parts shown in full lines in Fig. 9; and

Fig. 11 is a fragmentary perspective view of the gates of Fig. 7, showing, in an unnatural location (for purposes of clarity of disclosure) a snap-latch or slam-lock for the well-gates, which latter are the gates nearer the observer, and also means carried by both the sets of gates for releasing such lock as an incident to an opening of a pair of cage-gates opposite said well-gates.

Similar reference characters refer to similar parts throughout the several views of the drawings.

Essentially the system of the present invention discloses a method of controlling the elevator passenger traffic in a multi-storied building structure, which involves employing in the elevator shaft a car having a plurality of passenger compartments, one above another, loading passengers in both said passenger compartments (assuming there are only two) so that passengers for a first series of floors are in one compartment and passengers for another series of floors are in the other compartment, stopping the car so that the two compartments are opposite floors in both said series, and simultaneously discharging or loading passengers at the last-mentioned floors. As the invention is preferably carried out, that is, with a car having two compartments only, said compartments would serve, respectively, the even and the odd-numbered floors.

The invention thus combines a multi-decked passenger car or cage, the "skip-stop" system of operation, and "selective loading", to effect savings in floor area, in operating power, and in the time of loading and unloading, without impairing the service. Consider a large modern type of building with its spacious and generally high-ceilinged entrance corridor or main lobby at which all elevator service starts. Let it be assumed that this corridor is arranged so that between the entrance door of the building and the location of the elevator shafts two levels have been established, the difference between them being just the spacing of the floor levels of the upper stories, as a whole or in the vicinity of the shafts. These levels may be reached either by steps or ramps, regardless of whether each level is developed into an entire floor or whether the upper level is merely a mezzanine or balcony above the lower. Ordinarily said levels would be so located that a person on entering a street door would descend the equivalent of half the total ceiling height or would ascend an equal amount according to which level he was seeking, that is, according to whether his prevised cage travel was to terminate at one floor or another. The feature of "selective loading" mentioned consists in this, that a person desiring ultimately to alight at an odd numbered floor would be required to proceed to the lower level, those for the even numbered floors taking the route to the upper level. In the elevator shafts, of course, when merely two levels are thus provided for the entrance corridor or main lobby, will be two-storied cars with the two car-floors simultaneously registering with the two loading levels established, when the car is brought to a stop at the bottom of its shaft or well. When loaded, such car would carry twice the number of people that could be taken on a single car in the same shaft, and it would have to stop not oftener than every second floor.

In the form of the invention illustrated in the drawings, the car or cage is shown as including merely two passenger carrying compartments, an upper one and a lower one.

Referring to Figs. 1 and 2, said cage is shown at 12, herein an ordinary elevator shaft or well 14. The main lobby or entrance hall-way of the building is indicated at 15. Usually, if not always, such lobby is of considerably greater ceiling height than the floors 16 thereabove; the latter floors either having common ceiling height, as indicated in Fig. 1, or different ceiling heights, as indicated in Fig. 2. In the case of a story arrangement such as that shown in Fig. 2, particularly where the system is to be installed in a building already constructed, ramps 17 or equivalents, to provide floor portions adjacent the well-gates at the floors of higher ceiling height, may be provided; thereby in effect to equalize all the ceiling heights above that of the main lobby, so far as practicability of the new system is concerned. As to said main lobby, it may be arranged as indicated in Figs. 1 and 2, that is, with a ramp 18 or equivalent; while, if the building is already constructed, the building in of such an arrangement would not be costly, comparatively speaking. It is of course highly desirable, if not necessary, that the ceiling heights of the galleries, as they may be called, above and below the ramp 18, are equal, and equal to those of the upper stories 16; and so it may be required, as illustrated, to depress somewhat the floor level of the lower gallery. These upper and lower galleries are indicated respectively at 19 and 20; and of course they are so arranged, as by having the lower gallery 20 wider than the upper gallery 19, that a person entering the building by the main door 21 may walk directly either to the upper or the lower gallery, according as his destination is to be say an even-numbered or an odd-numbered floor,—assuming that the stories 16 are illustrated in Fig. 1 are numbered as there indicated by the ordinals 1, 2, 3, 4 and 5.

Referring to Figs. 3 to 7, the cage 12 is shown in Fig. 3 as in loading and unloading position relative to an odd-numbered floor and the floor immediately above; the floor or well-gates being indicated at 22 in Figs. 3 and 4 as being of the common type each including a pair of gates moved apart to open and moved together to close, when one gate of each pair is thus moved, as the result of rack and pinion connections, not shown, but well understood in the art. Throughout the drawings, also, the cage-closing gates indicated at 23 in Fig. 3 are assumed of the same type. As shown in said Fig. 3, the cage has, in addition to the conventional pitched roof 12ª, upper and lower passenger compartments 24 and 25, the intervening space 26 being usefully employed to house certain working mechanisms hereinafter fully described. One of the elements last referred to, a floor extension for the upper compartment, is here indicated at 27.

There also traverse this space 26 a periscope 28, and certain conduit elements of a loud speaking telephone or speaking-tube installation which includes a receiver 29 in each of the compartments, a transmitter 30 in each of the compartments, a main sound line 31, and branch sound lines 32 in each of the compartments. By this arrangement, the operator, assumed here to be stationed in the upper compartment, opposite the cage-starting and stopping control conventionally indicated at 33, may inspect the ingress and egress of passengers relative to the lower compartment when the cage is stopped and the doors or gates opposite said compartment are opened; may receive notices of stoppages desired by the last-mentioned passengers, and may announce to said passengers the fact of such a stoppage when required.

As shown in Figs. 3 and 5, the cage roof 12ª is desirably provided with a hinged lift-door 34, so that access to the interior of the cage may be had by a repairman or the like, by way of the floor immediately above a floor opposite to which a stopped cage has the floor of the upper compartment. This is a desirable provision, when the cage- and well-gates opposite a stopped car are arranged to be interlocked, as hereinafter described, for safety purposes; because, in case of trouble with the gates or incapacity of the operator, access to the cage from a floor opposite to which the cage is stopped might otherwise be difficult or impossible.

Such an interlocking of the cage-gates and the well-gates is illustrated most clearly in Figs. 6 and 7. Each pair of cage-gates 23 for each compartment is provided on its outer surface with a vertically elongated rib 35, adapted to ride between while slightly spaced from a pair of similar ribs 36 on each pair of well-gates passed by a moving cage during ascent and descent. While such gates are all shown open in Figs. 6 and 7, it will be understood that all gates are for safety, closed during such ascent and descent. These ribs are so fitted on the gates 22 and 23 that when a cage is stopped as shown in Fig. 3, the ribs 35 on the cage-gates nest within the pairs of ribs 36 on the well-gates 22 of the stories about to be served. Then, assuming for the moment that the well-gates are not provided with latch- or slam-locks having first to be released, all that the operator has to do to open the four well-gates and cage-gates simultaneously which serve the upper cage compartment, is to seize the handle 37 and pull same to the location shown in Fig. 6; and to simultaneously close said gates, all he has to do is to pull said handle to the same extent in the opposite direction.

In order to provide means for permitting the operator to open and close the cage-gates and well-gates for the lower compartment, there is provided a link and lever system as shown in Figs. 6 and 10. This system, the elements of which are delineated in Fig. 6 in broken lines when set to open the gates and in dot-and-dash lines when set to close the gates, includes a hand lever 38, shown in full lines in Fig. 10. This lever is fixed to a pivot shaft 39, as shown in Fig. 6, to which is also fixed an arm 40; the outer end of said arm being pivotally connected to a pair of links 41. These links are pivoted to the lower cage-gates 23, so that the links extend convergingly upward when said gates are closed and extend in one horizontal line when said gates are open.

It is highly desirable that the operator be absolutely precluded from closing the lower gates simultaneously with the closing of the upper gates, and also that a closing of the cage and well-gates for one compartment may not be started until the gates for the other compartment are closed. In Fig. 6, a means for insuring these results is disclosed. Such means includes a suitable disc, as a sprocket, 42, at the operator's station, rotatable by a handle 43, for operating endless members 44 and 45, as sprocket-chains. When these chains are thus operated, they rotate gears 46 in one direction or the other, according as the handle 43 is being moved in a clockwise or in an anti-clockwise direction. In the one case, a pair of plungers 47, equipped with rack teeth along their side edges which mesh with said gears, rise; and in the other case, said plungers descend. Pivotally carried at the bottom of each plunger is a pendent dog 48, having a free swing in one direction only from the vertical, due to the presence of stops 49. At the top of each plunger is an upstanding pivoted dog 50, weighted at its bottom as indicated so as normally to stand vertical, and having free swing in one direction only from the vertical, due to the presence of stops 51. With a structure such as that just described, it will be seen that with the parts arranged as shown in Fig. 6, the upper gates may not be closed. Said gates may, however, be closed after the handle 43 has been employed to cause the plungers 47 to descend to free the dogs 50 from recesses 52 in the bottoms of upper gates 23. But then the dogs 48 are entered into recesses 53 at the tops of the lower gates 23. So that while now the upper gates may be closed, the lower gates may not. However, as soon as the upper gates are closed, the handle 43 may be moved to cause the plungers to descend to enter the dogs 50 into recesses 54 in the bottoms of the upper gates 23. And then the lower gates 23 may also be closed. After both sets of gates 23 are thus closed, it is immaterial how the plungers be left adjusted. Whether the dogs 50 are left engaged with recesses 54 in the bottoms of upper gates 23, or whether the dogs 48 are left engaged with recesses 55 at the tops of the lower gates 23, either the upper or the lower gates may be opened regardless of condition of the other set of gates, due to the fact that the stops 49 and 51 do not interfere. Note also in this connection that recesses 54 and 55 are rounded at their outer corners nearer to the center of the cage.

Referring next to Figs. 6 and 8 to 10, the supporting and operating means are shown for the floor extension 27 for the upper compartment.

This extension, which is shown in full lines in Figs. 8, 9 and 10, is normally retracted so that its outer edge marked 27ª in Fig. 8 is back within the cage space 26 between the upper and lower passenger compartments. When, however, the cage is stopped at a pair of stories as indicated in Fig. 3, the extension is projected as there shown, so as to protect the heads of passengers entering or leaving the lower compartment from say an umbrella accidentally dropped by a passenger entering or leaving the upper compartment.

In order to provide means for normally maintaining the extension 27 retracted, and for automatically projecting the extension as a necessary operation preparatory to fully opening the lower pair of cage-gates 23, the following elements are provided: The extension 27 carries on its underside rollers 56 and roller-mounts 57; compare the full line delineations of Fig. 8 with the broken-line delineations of Fig. 6. These rollers travel on suitable horizontal tracks or shelves shown in full lines in Fig. 6 at 58. The extension 27 has secured thereto rearwardly extending arms 59 having cylindrical side extensions 59′ forming parts of pin-and-fork connections between said arms and upstanding arms 60 fixed at their lower ends on a suitably journalled rock-shaft 61. Between arms 60 this shaft has fixed thereon an upstanding arm 62 connected to one end of a retractile spring 63 the other end of which is connected to a bracket 64. This rock-shaft 60 at one end has also fixed thereon a non-uniplaner L-fixture 65 so shaped and disposed that an enlargement 65′′ at its free end is engaged and depressed by a coacting part carried by hand-lever 38 as indicated at 66 in Fig. 10, at a certain point in the movement of said hand-lever to open the lower cage-gates 23. Thus, coincidentally with the opening of the last-mentioned gates, extension 27 is projected; and, during the closing of said gates, spring 63 is released to retract said extension.

Referring finally to Fig. 11, there is shown a means for snap-latching or slam-locking the well-gates 22 when the latter are closed by the closing of cage-gates 23 opposite to the same. This means includes here a keeper 67 on one of the gates 22, and a bolt or hook-catch 68′ at one end of a bell-crank lever 68 pivoted on the other gate 22. With the parts arranged as shown, the elements 67 and 68′ are held interlocked by an expansile spring 69 working through a link 70 pivoted at one end to the bell-crank lever and at its other to one end of a rocker-fitment 71 hinged on brackets 72. The other end of said fitment is lipped as indicated at 71′ so that, on slightly separating the cage-gates 23, as would be incidental to an attempt to sweep open all the gates 22 and 23 of Fig. 11, a wiper-fitment 73 secured to a cage-gate 23 engages such lip and unlocks the elements 67 and 68′. If such a mechanism as that just described is installed, the ribs 35 and 36 of Fig. 7 will be suitably spaced laterally of the gates 22 and 23, that the required initial play of the cage-doors 23 will be permitted. It will of course also be understood that the showing of Fig. 11 is unnatural in that the latching and unlatching mechanism is shown as apparently located on the outsides of the well-gates 22; whereas in practice, obviously, this mechanism will be on the rear sides of said gates, or cased in, or otherwise shielded from being tampered with by a would-be suicide or other person unauthorized to obtain access to the well directly from an upper story of the building. It may of course be advisable to permit an authorized person to open any well-gates desired when a cage is not opposite said gates; and it is contemplated that the well-gates will be equipped with some suitable lock, operable by the proper key when inserted, which will then thrust a bolt or the like to rock the bell-crank lever to release the elements 67 and 68′.

I propose the foregoing system, regardless of course of details of mechanical structure, as a solution to the elevator problem encountered in many buildings of the sky-scraper type, and as a system having all the advantages hereinabove referred to, and as a system, farther, the cost of installation of which, even in a building already constructed, will be largely offset by the saving in power alone. It is well recognized that power is chiefly used in starting and accelerating the cages or cars during descent as well as during ascent; the power used to maintain the car at full speed being relatively small.

I prefer the foregoing system, regardless of the aforesaid mechanical structure details, over any other which I now conceive could be devised to secure the advantages in mind, within the scope of the invention. For instance, more than one cage could be run in a single shaft; but this would present many difficulties in practical operation. There might be adopted a "skip-stop" plan analogous to the skip-stop used in some transit systems, but this would probably be classed as unsatisfactory service by tenants of the skipped floors, who would have to walk up or down stairs; while if stops in alternate shafts were staggered there would be only half as many opportunities to catch a car promptly.

In modern office buildings of heterogeneous occupancy practically the entire elevator service is from the main entrance floor to the upper floors or vice versa. The service required from one of the upper floors to another upper floor is very slight indeed. Even in those buildings where all or many of the floors are occupied by a single industry, with a consequent increase of communication between the different floors, the maximum elevator requirement is in general set by the morning, noon and evening "rush hours", when employes are seeking transportation from or to the main floor.

Yet the main objection that might be levelled against the new system is the possible interference with travel between the upper floors. If a person wished to go from an odd numbered floor to another odd numbered floor, or from an even-numbered floor to another even numbered floor, there would be no difference from present practice. If he wished to move from an odd to an even floor, or vice versa, the difficulty could be solved simply. If the call for this sort of service were very limited, he might be required to walk one flight at either end of his journey. If there were enough demand to warrant, it would be possible to assign one or several elevators in the non-rush hours to operate using only one of the cage compartments and stopping at any floor required.

As to the operation of the new system in the form illustrated in the drawings:

Imagine a 20 story building and 20 people at one time desirous of going up from the main floor, one destined to each of the upper floors. In present practice the shaft would have to be large enough for a 20 passenger cage; the cage would have to wait at the main floor for a sufficient length of time for 20 people to arrive and pass through the gates into the cage; the cage would have to stop 20 times, once at each upper floor; it would have to wait at each of 20 stops long enough for one passenger to pass through the door. With the illustrated arrangement, however, the shaft would only have to be big enough for a 10 passenger car; the car would wait while loading for only 10 people to pass through the upper gates, the 10 persons on the lower level entering simultaneously; the cage would stop only 10 times, once each time the upper compartment comes opposite an even-numbered floor; and it would wait at each of 10 stops long enough for one passenger to pass through the gates of the upper compartment while simultaneously a passenger is leaving the lower compartment.

Thus, even allowing for the extra control manipulations and inspections of the operator at each stop, we have cut the loading and unloading time at least approximately in one-third, and have halved the number of stops; thus materially decreasing the time taken to travel the length of the shaft and increasing the possible number of trips per hour. If the new system is used on a sufficiently large scale, more trips per hour mean fewer elevator shafts, with a consequent saving in rentable floor area. We have also cut the number of stops in half, with a consequent saving of almost half the operating power consumed. And incidentally we have moved each passenger to his destination more quickly than heretofore.

Not always, of course, will the passengers be divided half for the odd floors and half for the even floors. Then, too, in non-rush periods the power saving may be expected to be less. But elevator installations must be made with regard to the maximum demand, and as at the time of maximum demand the present system most nearly approaches the maximum savings indicated, substantial economic returns are present.

The invention of course is not necessarily to be limited to a two-storied car, but could use one of three-stories or even more, where difficulties in connection with selective loading are not imported.

One operator for each car would in any case suffice; handling all gates by means such as already described or by door-engines somewhat as is done in our subway trains at present where one guard handles three cars each with three side doors. As platform guards are there needed at the busy stations during rush hours to assist the loading, so "starters" would be useful at the various levels of the entrance corridor, at times of heavy traffic.

Inasmuch as many changes could be made in the above constructions, and many apparently widely different embodiments of the invention could be made without departing from the scope thereof, in addition to those hereinabove specifically referred to, it is intended that all matter contained in the above description or shown in the accompanying drawings shall be interpreted as illustrative and not in a limiting sense.

It is also to be understood that the language contained in the appended claims is intended to cover all the generic and specific features of the invention herein described and all statements of the scope of the invention which, as a matter of language, might be said to fall therebetween. Obviously, the scope of protection contemplated is to be taken solely from said claims, interpreted as broadly as is consistent with the prior art, and with explanatory references to the specification only where a claim is ambiguous or to be impliedly limited beyond its express terms to avoid such art in order to save the validity of the claim.

I claim:

1. An elevator system for a building of sufficient height to have many groups of stories with at least two stories in each group, the combination of a story arrangement such that one story of each of said groups has a shaft-adjacent floor-level spaced vertically the same distance from a similar level of another story of that group, an elevator shaft passing at least a majority of said stories, a car movable in said shaft and having upper and lower passenger compartments, gates on the car operable to permit or prevent ingress to and egress from either compartment at any floor, a single operator station in the car, and means operable from said station for operating the gates first relative to one compartment and next relative to another.

2. In an elevator system for a building of sufficient height to have many groups of stories with at least two stories in each group, the combination of a story arrangement such that one story of each of said groups has a shaft-adjacent floor-level spaced vertically the same distance from a similar level of another story of that group, an elevator shaft passing at least a majority of said stories, a car movable in said shaft and having upper and lower passenger compartments, shaft gates at each of said stories, and means on the car for controlling the opening and closing of a gate at either one of two stories on stopping car to position a compartment approximately opposite one of said two stories.

3. In an elevator system for a multi-storied building, a well serving a plurality of said stories, a multi-storied elevator cage in said well, well-closing gates on a plurality of the building stories, cage-closing gates on a plurality of the stories of the cage, and means operable from one of the stories of the cage for opening and closing all of said gates.

4. In an elevator system for a building having many stories, the combination of an elevator shaft serving a large number of said stories, a car in said shaft having an upper passenger compartment and a lower passenger compartment, said large number of stories being arranged in groups with each group having floor-portions adjacent the shaft spaced vertically a distance equal to the vertical distance between the floors of the upper and lower compartments of the car, a single control station in one of the car compartments, and means whereby the operator of the car at said station may visually examine ingress or egress movements of a passenger relative to the other compartment.

5. In an elevator system for a building having many stories, the combination of an elevator shaft serving a large number of said stories, a car in said shaft having an upper passenger compartment and a lower passenger compartment, said large number of stories being arranged in groups with each group having floor-portions adjacent the shaft spaced vertically a distance equal to the vertical distance between the floors of the upper and lower compartments of the car, a single control station in one of the car compartments, and a signal means between the two compartments.

6. In an elevator system for a building having many stories, the combination of an elevator shaft serving a large number of said stories, a car in said shaft having an upper passenger compartment and a lower passenger compartment, said large number of stories being arranged in groups with each group having floor-portions adjacent the shaft spaced vertically a distance equal to the vertical distance between the floors of the upper and lower compartments, and means for receiving audible sound arising in one compartment and reproducing the same in the other compartment.

7. In an elevator system, the combination of a shaft, a cage therein having a plurality of passenger compartments at different levels for serving more than one story at a time, gates at said stories, means for opening and closing said gates, and means for preventing the closing of a gate on one story until the gate on another story is closed.

8. In an elevator system, the combination of a shaft, a cage therein having a plurality of passenger compartments at different levels for serving more than one story at a time, gates for said compartments, means for opening and closing said gates, and means for preventing the closing of the gate of one compartment until the gate of another compartment is closed.

9. A multi-storied building structure and elevator system therefor, including, in combination, a main story, a plurality of other stories each forming one terminus of a possible trip the other terminus of which is said main story, said main story carrying a plurality of floor-portions at different levels, said other stories being arranged in sets having respectively floor-portions spaced vertically similar to the different levels of the floor-portions of the main floor, an elevator shaft serving said stories, and a multi-storied car in said shaft having floors spaced vertically similar to the different levels of the floor-portions of the main floor.

10. In an elevator system for a multi-storied building, a well serving a plurality of said stories, a multi-storied elevator cage in said well, well-closing gates on a plurality of the building stories, cage-closing gates on a plurality of the stories of the cage, and means for operating a well-closing gate from the cage when the cage is opposite the latter gate, said means being inoperative while the cage is moving through the well at a point removed from said well-closing gate.

11. In an elevator system for a multi-storied building, a well serving a plurality of said stories, a multi-storied elevator cage in said well, well-closing gates on a plurality of the building stories, cage-closing gates on a plurality of the stories of the cage, and means operable from the cage for opening a cage-closing gate and also for opening a well-closing gate opposite said cage-closing gate, said means being inoperative while the car is in the well at a point removed from said well-closing gate.

12. In an elevator system for a multi-storied building, a well serving a plurality of said stories, a multi-storied elevator cage in said well, well-closing gates on a plurality of the building stories, cage-closing gates on a plurality of the stories of the cage, latch-locks for slam-locking said well-closing gates, and means operative from the cage for opening a cage-closing gate and simultaneously opening a well-closing gate opposite said cage-closing gate, the means last mentioned including means for automatically unlocking the latch-lock on said well-closing gate when said cage-closing gate is opened.

13. In an elevator system, the combination of a shaft, a cage therein having a plurality of passenger compartments at different levers for serving more than one story at a time, gates at said stories, means for opening and closing said gates, and means for temporarily extending the floor of the upper level compartment toward the side of the shaft having said gates.

14. In an elevator system, the combination of a shaft, a cage therein having a plurality of passenger compartments at different levels for serving more than one story at a time, gates at said stories, means for opening and closing said gates, gates on said cage at said different levels, an auxiliary floor extension for the upper compartment normally retracted, and means for automatically projecting said extension when one of said gates is opened.

15. In an elevator system, the combination of a shaft, a cage therein having a plurality of passenger compartments at different levels for serving more than one story at a time, gates at said stories, means for opening and closing said gates, gates on said cage at said different levels, an auxiliary floor extension for the upper compartment, means for projecting said extension, and means for preventing the retraction of said extension until one of the gates opposite the lower compartment is closed.

HOBART MASON.